US006324851B1

United States Patent
Szász et al.

(10) Patent No.: US 6,324,851 B1
(45) Date of Patent: Dec. 4, 2001

(54) CRYOSTAT FOR USE WITH A SUPERCONDUCTING TRANSFORMER

(75) Inventors: Paul Szász, Plankstadt; Harald Reiss, Heidelberg, both of (DE); Thomas L. Baldwin, Tallahassee, FL (US); Varagur R. Ramanan, Cary, NC (US); Dietrich Bonmann, Meckenheim (DE)

(73) Assignee: ABB Power T&D Company Inc., Raleigh, NC (US)

( * ) Notice: Subject to any disclaimer, the term of this patent is extended or adjusted under 35 U.S.C. 154(b) by 0 days.

(21) Appl. No.: 09/457,789

(22) Filed: Dec. 9, 1999

(51) Int. Cl.$^7$ .................................................. F25B 19/00
(52) U.S. Cl. ............................................... 62/51.1
(58) Field of Search ...................... 62/51.1, 45.1

(56) References Cited

U.S. PATENT DOCUMENTS

| | | | |
|---|---|---|---|
| 4,348,630 | 9/1982 | Boenig et al. | 323/207 |
| 4,902,215 | 2/1990 | Seemann, III | 425/406 |
| 5,052,906 | 10/1991 | Seeman | 425/112 |
| 5,107,240 | 4/1992 | Tashiro et al. | 336/60 |
| 5,138,383 | 8/1992 | Shiga et al. | 335/216 |
| 5,172,582 | 12/1992 | Tench et al. | 73/40.7 |
| 5,250,508 | 10/1993 | Pham | 505/1 |
| 5,316,462 | 5/1994 | Seemann | 425/112 |
| 5,325,080 | 6/1994 | Chandratilleke et al. | 335/216 |
| 5,339,062 | 8/1994 | Donaldson et al. | 505/211 |
| 5,379,020 | 1/1995 | Meier et al. | 505/211 |
| 5,436,606 | 7/1995 | Cottevieille et al. | 335/216 |
| 5,686,877 | 11/1997 | Keller et al. | 335/216 |
| 5,689,223 | 11/1997 | Demarmels et al. | 335/216 |
| 5,812,042 | 9/1998 | Maki et al. | 335/216 |
| 5,872,308 | 2/1999 | Bowling | 73/40 |
| 5,956,957 | * 9/1999 | Lowry et al. | 62/51.1 |
| 6,157,276 | * 12/2000 | Hedeen et al. | 335/216 |

FOREIGN PATENT DOCUMENTS 0 590 546 B1    5/1996   (EP).

OTHER PUBLICATIONS

P.G. Therond et al., "High Temperature 630 kVA Superconducting Transformer" Proc. of 37$^{th}$ Cigré Session 1998, Paper No. 12–302,, Prais, Aug. 30–Sep. 5, 1998.

S. Hörnfeldt, et al., "Power Transformer With Superconducting Windings," *IEEE Trans. Mag.*, vol. 29, No. 6, Nov. 1993.

K. Funaki et al., "Preliminary Tests of a 500 kVA—Class Oxide Superconducting Transformer Cooled by Subcooled Nitrogen," *IEEE Trans. Appl. Superconductivity*, vol. 7, No. 2, Jun. 1997.

* cited by examiner

Primary Examiner—William Doerrler
Assistant Examiner—Malik N. Drake
(74) Attorney, Agent, or Firm—Woodcock Washburn Kurtz Mackiewicz & Norris LLP

(57) ABSTRACT

A cryostat for a superconducting transformer is provided that includes non-conducting load bearing insulation and is adapted for use with a superconducting transformer. In addition, the cryostat prevents the formation of closed loop stray currents on its outer case. The cryostat contains the winding sets and other related electrical equipment of a transformer. The cryostat generally comprises a cryogenic tank having an outer wall, a non-conducting liner, and a load bearing insulation layer disposed therebetween. The tank holds a liquid or gaseous cryogenic coolant into which the components of the transformer are immersed. A plurality of passages allow the passage of the limbs of the iron core of the transformer through the tank.

33 Claims, 6 Drawing Sheets

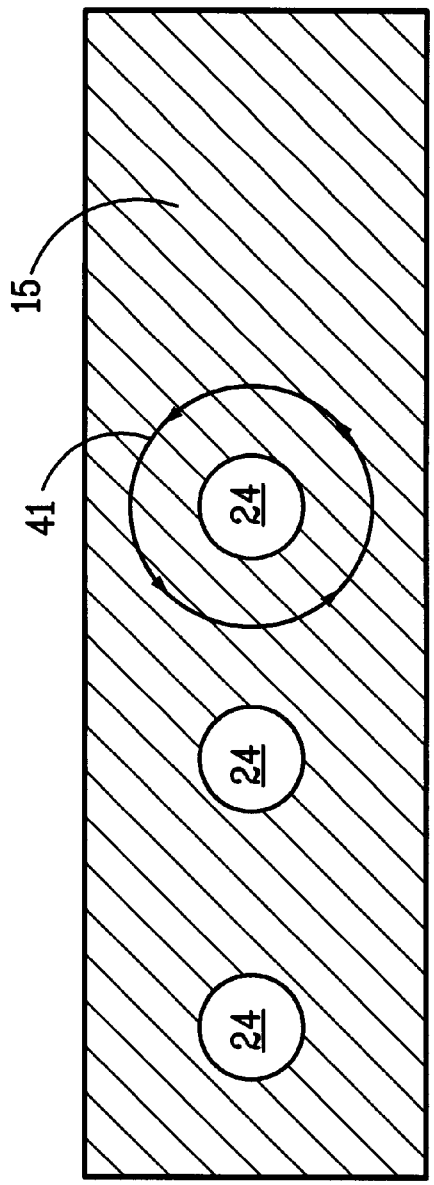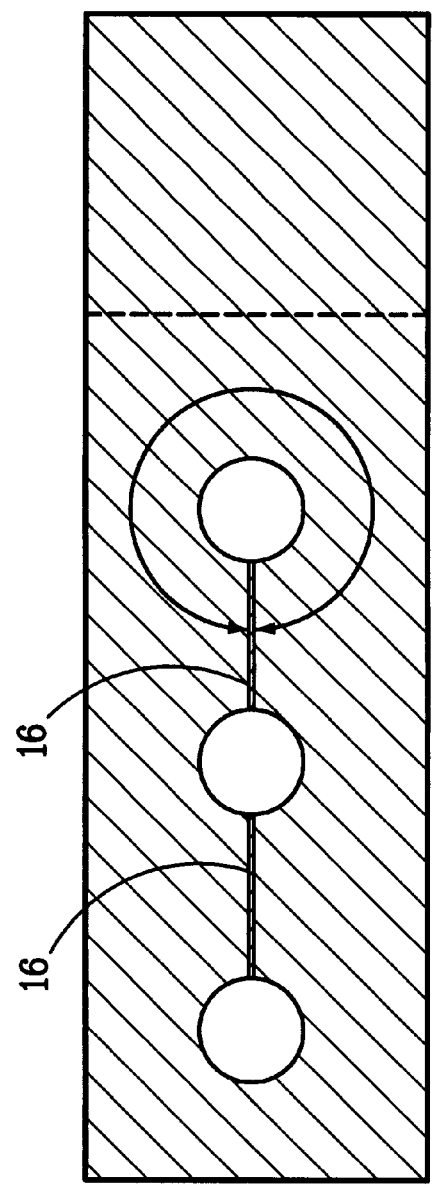

CRYOSTAT FOR USE WITH A SUPERCONDUCTING TRANSFORMER

FIELD OF THE INVENTION

This invention generally relates to transformers. More particularly, the invention relates to a cryostat for use with a superconducting transformer which limits transformer losses caused by stray currents and maintains the coils of the superconducting transformer under cryogenic conditions.

BACKGROUND OF THE INVENTION

A transformer generally comprises primary and secondary insulated copper coils wound about a ferromagnetic core so as to be magnetically coupled thereto. The efficiency and performance of a transformer are limited by the electrical resistance of the coils and magnetization (hysteretic) losses of the core. Losses resulting from the coils and core are commonly referred to as "wire" and "core" losses. Wire losses result from the electric resistance of the coils of the transformers while core losses result from the magnetic hysteresis of the metallic laminations of the transformer core.

Wire losses and core losses either directly or indirectly generate heat which must be dissipated or the transformer will overheat and burn out. Generally, heat is dissipated through the structural surfaces of the transformer, i.e., through the transformer casing, or through radiators and cooling fins located thereon. As higher voltages and currents are transformed, more heat is generated by the wire and core losses. Larger electrical insulation distances and wire cross-sections require more space. Thus, for the transformation of larger powers, transformers increase in dimensions and weight, and require larger cooling surfaces.

The performance limitations of conventional transformers are overcome by superconducting transformers. Superconducting transformers experience lower losses than a conventional transformer and are thus more efficient and produce less heat. In addition, a superconducting transformer is more compact and lightweight than a conventional transformer. In general, a superconducting transformer comprises primary and secondary superconducting coils that are wound about a ferromagnetic core so as to be magnetically coupled thereto.

The superconducting coils are placed within a cryostat so as to maintain them at superconducting temperatures. The cryostat generally comprises a heat insulating tank that is filled with a cryogenic coolant so as to maintain the coils at superconducting temperatures. Although the tank is insulated, heat transfer to the inside of the tank can occur. A refrigeration unit is connected to the tank to dissipate this heat and cool the tank. As is well known, however, low temperatures adversely affect the efficiency of a refrigerator to remove heat. For example, in the low temperature environment that exists within the cryogenic tank, a penalty factor of about 10 to 25 is incurred. That is, about 10 to 25 watts of electrical input power will be required for the removal of 1 watt at 77 degrees kelvin.

The heat dissipation penalty factor increases the need to minimize all heat influx into the cryogenic tank so as to decrease the amount of input power that must be consumed by the refrigerator. For example, it has been attempted to lessen heat leakage occurring along the electrical connections by locating such connections internal to the tank so as to minimize hot-cold transitions. Even if the amount of heat generated is low, it is costly to dissipate in the low temperature environment of the cryogenic tank due to the penalty factor.

Core losses produce a significant amount of heat that must be dissipated. Due to the heat dissipation penalty factor, these core losses will offset performance efficiency gains from the superconducting coils. For this reason, cryostats for superconducting transformers have been provided with thermal insulation that isolates the core from the cryogenic coolant. For example, U.S. Pat. No. 5,107,240, issued to Tashiro ("the Tashiro patent"), discloses a superconducting transformer in which the core is isolated from the cryostat. The cryostat comprises an outer case having a first and second outer wall that are linked together by a central rod so that the outer walls and the central rod form the core of the transformer. The inner portion of the cryostat is isolated from the core by a fiber reinforced polymer double walled liner wherein a vacuum space is defined between the double walls. The polymer liner contains the cryogenic coolant into which the superconducting coils are submerged. The vacuum space between the double walls of the polymer liner insulates the core from the cryogenic coolant. In addition, the polymer liner prevents the formation of eddy currents in the walls of the cryostat tank.

The outer wall and the central rod of the cryostat described in the Tashiro patent comprise the core of the transformer. In addition to carrying the main flux of the transformer, the outer wall must also provide structural integrity for the cryostat, requiring that the outer wall be thicker. This provides more surface area for the formation of eddy currents and increases generated waste heat. In order to adequately insulate the core, the vacuum space between the walls of the inner liner must be enlarged. Expanding the vacuum space decreases the volume of the cryostat so that less cryogenic coolant can be contained therein which decreases the ability of the cryostat to maintain cryogenic temperatures.

The thermal insulation described in the Tashiro patent is not load bearing and is unable to withstand the pressure differential between the inside of the cryostat and the vacuum space. Thus, both the outer wall and the inner liner must be dimensioned so as to sufficiently support the pressure differential. The inner liner is also limited in that it is constructed from a polymeric material. The inner liner forms the cold interface of the cryostat. If not properly selected and designed to withstand such conditions, polymers can develop micro-cracks which can lead to cryogenic coolant, or heated gases, leaking into the vacuum space and destroying the thermal insulating property of the vacuum space between the hot and cold surfaces. In addition, polymers are gas permeable so that even if micro-cracks do not develop, the integrity of the vacuum space could be compromised by gas diffusion.

In the Tashiro patent, the electrical connections to the supply and load sides of the transformer are made external to the cryostat. Transformers are usually built as three-phase units, with electrical connections between phases for the formation of the desired vector group, and with internal connections between windings and a tap changer for the adjustment of the voltages. These connections should preferably be made inside the cryostat because each transition between cryogenic and ambient temperatures increases the parasitic heat leaks. In addition, internal connections can be made much more compact in the dense, electrically insulating cryogenic medium.

Currently, there is no cryostat that internally accommodates the windings and electrical connections for a three phase transformer while thermally insulating the core from the windings and is structurally strong. Thus, the need for such a cryostat exists.

SUMMARY OF THE INVENTION

A cryostat for a superconducting transformer is provided that includes non-conducting load bearing thermal insulation and is adapted for use with a three phase superconducting transformer. In addition, the cryostat prevents the formation of closed loop stray currents. The cryostat contains the winding sets and other related electrical equipment of the transformer. It is preferred that the cryostat accommodate a three phase transformer that includes three sets of windings and a tap changer for voltage regulation. This allows all electrical connections between phases and the tap changer to be made without heat transitions and parasitic heat leaks associated with multi-tank cryostats.

The cryostat generally comprises a cryogenic tank having an outer wall, a non-conducting liner, and a load bearing thermal insulation layer disposed therebetween. The tank holds a liquid or gaseous cryogenic coolant into which the components of the cryostat are immersed. A plurality of passages allow the passage of the limbs of the iron core of the transformer through the tank. The surfaces of the passages surround and form a closed loop path around the core. In order to prevent the flow of electric current in these closed loops, the inner and outer walls of the passages are constructed from a non-conducting material, or from conducting material with discrete non-conducting inserts interrupting the loops. The space between the inner and outer walls also serves as an insulation layer for preventing the dissipation of core heat into the cryogenic coolant.

The outer wall of the tank is constructed from a metallic material, such as constructional steel, stainless steel or aluminum, which provides both protection against severe internal electrical faults and captures stray magnetic flux. A problem with using a metallic material, however, is that the tank forms closed current paths. The magnetic flux of the core will induce current in these closed loops. In order to prevent this, the loops are electrically split in the top and the bottom of the cryostat, which surround the legs of the core. Alternatively, the top and bottom of the cryostat are constructed from electrically insulated material.

Thermal insulation is disposed between the outer wall of the tank and the liner. Preferably, this insulation layer comprises load bearing evacuated insulation that is maintained under vacuum pressure. The metallic outer wall of the tank and the load bearing insulation support the weight of the transformer components and the cryogenic coolant. The metallic outer surface of the tank also helps to maintain vacuum conditions because it is non-gas permeable. This is particularly important because the outer walls of the tank are usually at or above ambient temperature. In contrast, composites at ambient conditions exhibit much higher rates of gas permeation, thus leading to degradation of the internal vacuum over the typically desired 30 year life of the transformer.

The warm outer walls of the cryostat are covered on the inside with a load-bearing thermal insulation material, e.g., glass fiber boards made from pre-compressed dry glass fibers, which are subsequently covered with a thin, non load-bearing, vacuum tight liner. Internal loads from the weight and/or pressure of the cryogenic medium are transferred to the warm outer walls. The liner is vacuum tight and is preferably constructed from a fiber composite, produced in situ, without any additional molds other than the outer walls of the metallic case and the load-bearing insulation. One method for manufacturing the internal liner is via vacuum assisted resin infiltration. At cryogenic temperatures, the gas permeation rate of a composite is reduced by several orders of magnitude, which allows a long lifetime of the vacuum in the load-bearing insulation. Alternatively, the internal liner can be constructed from metal with sufficiently high electrical resistance, e.g., stainless steel of a few micrometers in thickness. The metallic liner will include splits that prevent the formation of closed loops.

Combining a metallic outer case and a non-conducting composite liner provides several advantages. Eddy current losses associated with cold metallic surfaces exposed to the time-varying magnetic stray field from the windings are eliminated. The combination of the metallic case and non-conducting composite liner allows for the fabrication of the liner directly in the metallic case, eliminating the need for a mold. In addition, dielectric shields can be integrated in the composite lamination process in the form of a wire mesh or metal coated glass fibers or carbon fibers. Finally, the load-bearing insulation, made from glass fibers, densely packed powders, or similar materials of low thermal conductivity, and having a very large internal surface, will act as a cryo-adsorption pump, thus significantly improving the lifetime of the insulating vacuum.

BRIEF DESCRIPTION OF THE DRAWINGS

The above-mentioned and other features and advantages of the invention will be apparent to those of ordinary skill in the art from the following detailed description of which:

FIG. 6 is a bottom view of the cryostat of the invention; and

FIG. 7 is a bottom view of a second exemplary cryostat of the invention.

DETAILED DESCRIPTION OF THE PREFERRED EMBODIMENTS

Figure 1:
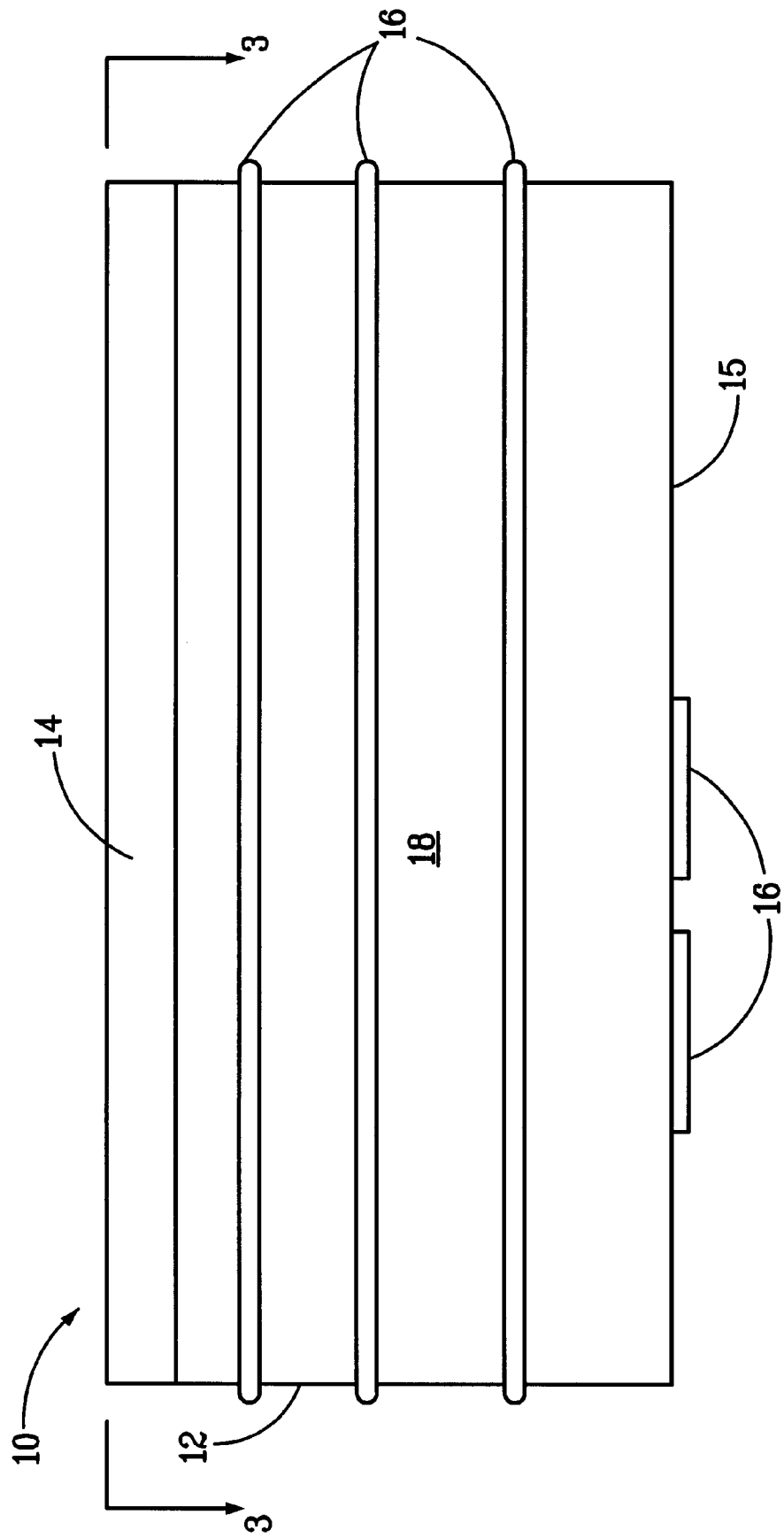
FIG. 1 is a side elevational view of the cryostat of the invention.

A cryostat according to the invention will be described with reference to FIGS. 1–7. The cryostat 10 accommodates the winding sets 30 and other related electrical equipment of a superconducting transformer and maintains them under cryogenic conditions. It is preferred that the cryostat of the invention accommodate all three phases of the transformer which includes all three windings and a tap changer 28 for voltage regulation. This allows all electrical connections between phases and the tap changer to be made without heat transitions and parasitic heat leaks associated with multi-tank cryostats.

As shown in FIGS. 1–4, the cryostat 10 comprises a tank 12 having an outer wall 18, a non-conducting liner 22, and a load bearing insulation layer 20 disposed between the wall 18 and the liner 22. The outer wall 18 of the tank 12 is constructed from a metallic material, such as constructional steel, stainless steel, or aluminum, that provides protection against severe internal electrical faults and/or captures and deflects stray magnetic flux generated by the core of the superconducting transformer. In addition, a metallic material is non-gas permeable at ambient temperatures which helps to maintain vacuum pressure as will be described in greater detail below. The liner 22 preferably comprises a thin polymer/fiber composite liner. Dielectric shields, in the form of a wire mesh, carbon fibers or metal coated glass can be integrated in the composite liner 22. The insulation layer 20 comprises a load-bearing thermal insulation material that exhibits sufficient compressive strength to transmit the internal pressure acting on the liner 22 to the outer wall 18, and that has a thermal conductivity as low as 2 mW/m/K.

The non-conducting composite liner 22 prevents the formation of eddy currents in the inner walls of the tank 12. Combining the metallic outer case 18 and a non-conducting composite liner 22 provides several advantages. Eddy current losses, associated with the time-varying magnetic stray field from the windings and acting on metallic surfaces in contact with the coolant, are eliminated. Eddy current losses in the outer metallic surfaces in contact with ambient will be experienced, but are of less consequence because they are dissipated at ambient temperatures. In addition, flexible expansion members can be formed integrally with the liner 22 to compensate for thermal expansion of the liner 22.

The internal liner 22 is disposed within the tank 12 so that a space exists between the outer wall 18 and the liner 22. A layer of insulation 20 is disposed in the space between the outer wall 18 and the liner 22. In order to lower the thermal conductivity of the layer 20, it is preferred that the insulating layer 20 be maintained under vacuum conditions. Maintaining the insulation layer 20 under vacuum conditions, however, creates a pressure differential between the inside of the tank 12 and the space between the outer wall 18 and the liner 22. This pressure differential exerts forces on liner 22 which tend to push it outwardly towards the wall 18. The present invention utilizes a load bearing insulation which is capable of supporting the pressure differential between the vacuum and the inside of the tank. For example, the layer 20 can comprise stacked evacuated glass fiber boards that exhibit sufficient structural strength and have a thermal conductivity as low as 2 mW/m/K.

The thermal insulation layer 20 can be maintained at a vacuum pressure in the range of about 0.001 bar to 0.00001 bar. At ambient temperatures, polymers and polymer composites have a gas permeation rate several orders of magnitude higher than that of metals, which are practically non-gas permeable. The gas diffusing into the layer 20 must be removed or pumped out in order to prevent the thermal conductivity from increasing. For example, the thermal conductivity of the layer 20 could increase by at least one order of magnitude within a period of hours if the diffused gases are not removed. Given a typical lifetime for transformers, which is about 30 years, pumping is highly undesirable because of the costs associated therewith. In order to obviate the need for a pump, about one-third of the porous thermal insulation material of the layer 20 is in contact with the liner 22. The liner 22 is maintained at cryogenic temperatures. Thus, a portion of the layer 20 will be cold enough to act as a cryogenic adsorption pump. Any gas that may still leak into the layer 20 will thus be adsorbed at the very large internal surfaces of the porous insulation material.

Unlike the external portions of the tank 12, which are at ambient temperatures, a composite material may be used for the internal liner 22. The liner 22 is held at or near cryogenic temperatures wherein the gas permeation rate of a composite is reduced by several orders of magnitude. Thus, using a composite material for the internal liner will not adversely affect vacuum integrity in the load bearing insulation layer 22. In addition, the composite liner may be formed integrally with a non-gas permeable metallic foil.

Figure 5:
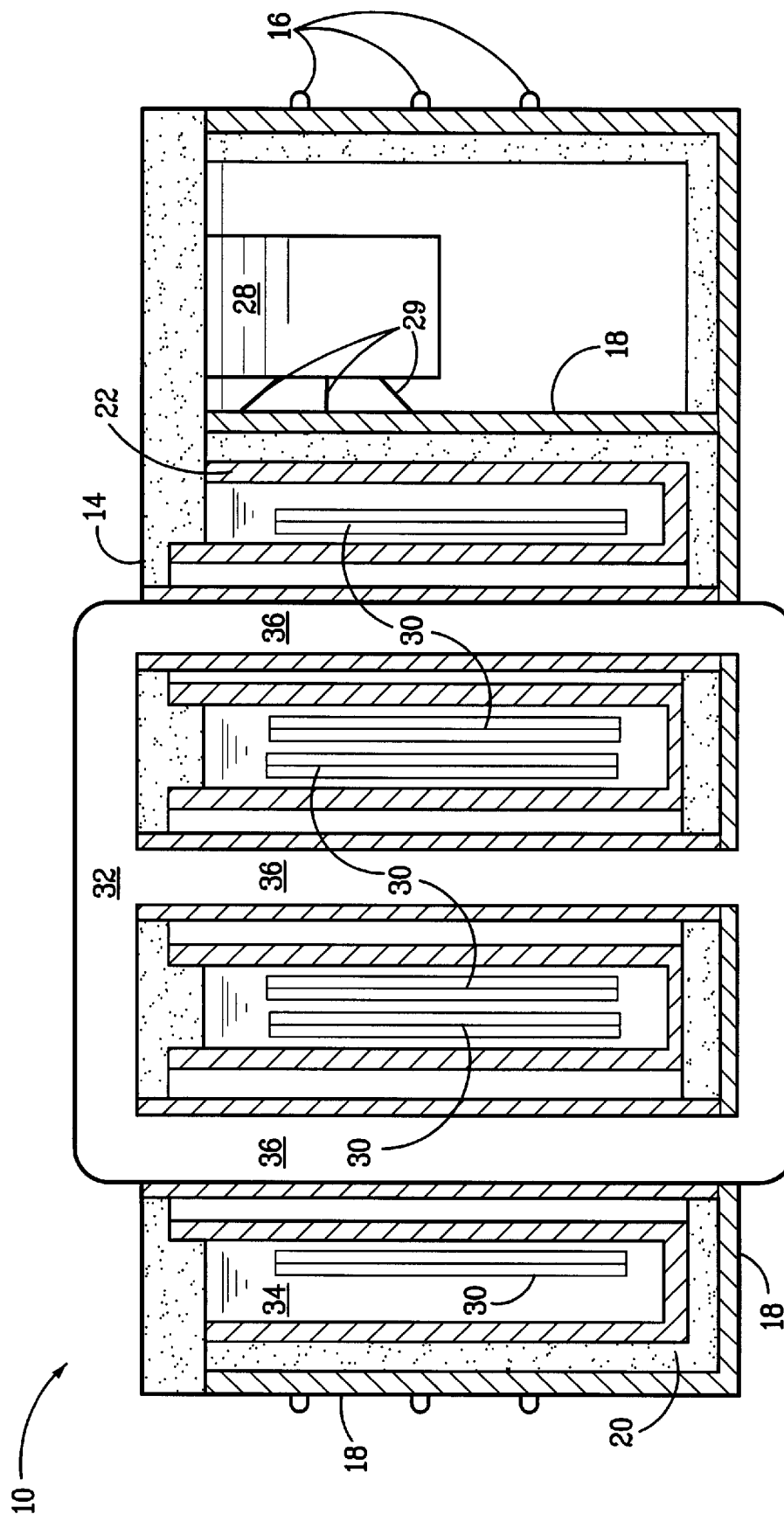
FIG. 5 is a side elevational view showing a transformer housed within the cryostat of the invention.

As shown in FIG. 5, the metallic core 32 of a three phase superconducting transformer extends through the cryostat 10. The tank 12 holds a liquid or gaseous cryogenic coolant 34 into which a tap changer 28 is immersed. The tap changer 28 performs voltage regulation and is disposed within the tank 12. The core limbs 36 are not immersed in the coolant, but go through passages 24. In addition, all the electrical leads 29 between the windings and from the windings to the tap changer 28 are housed within the tank 12. Mounted atop the tank 12 is a lid 14 that is removable whenever it is desired to perform maintenance on the cryostat 10. The lid 14 is preferably constructed from a non-conducting, load bearing insulating material.

Figure 2:
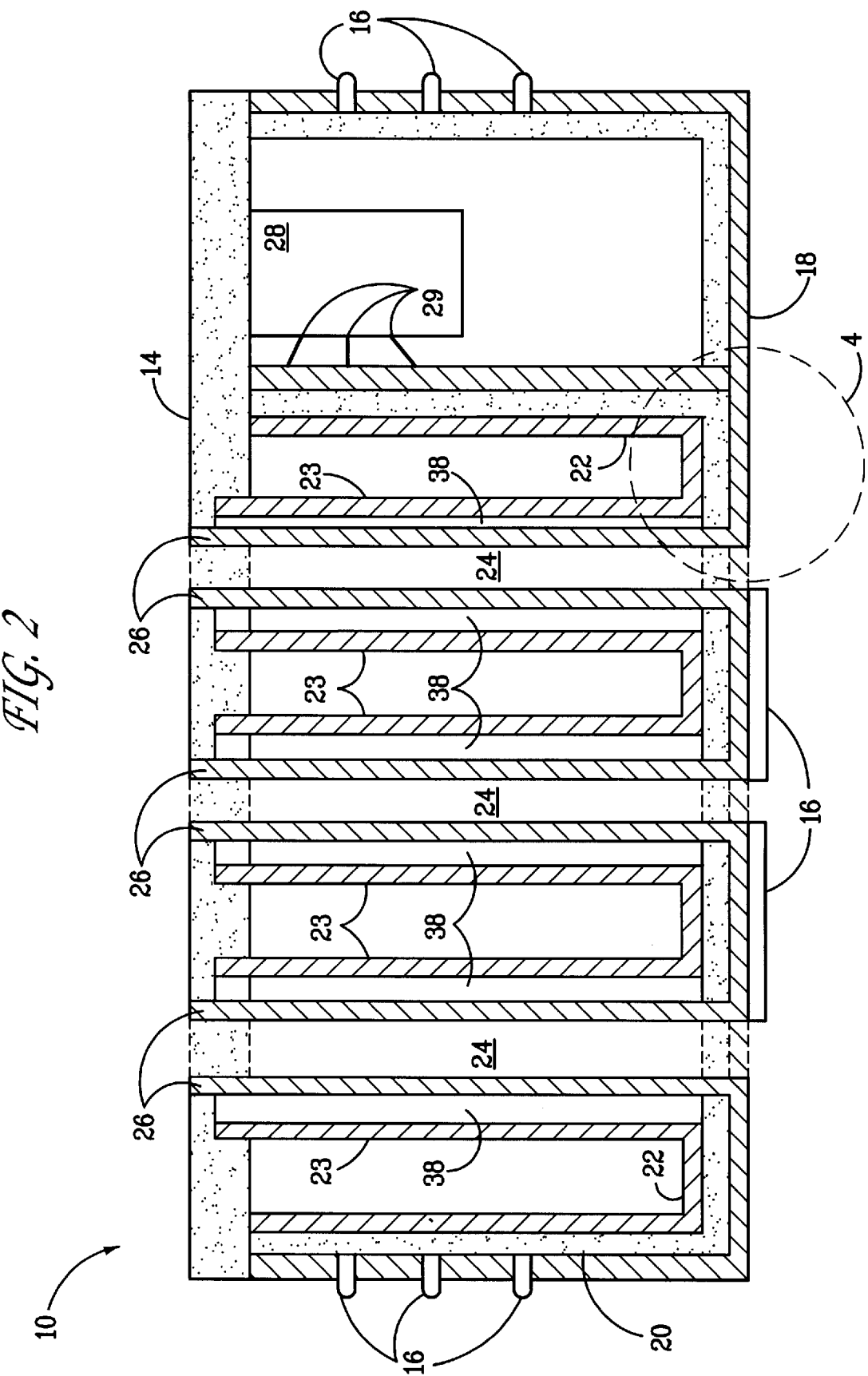
FIG. 2 is a cut-away view of the cryostat of the invention.
Figure 3:
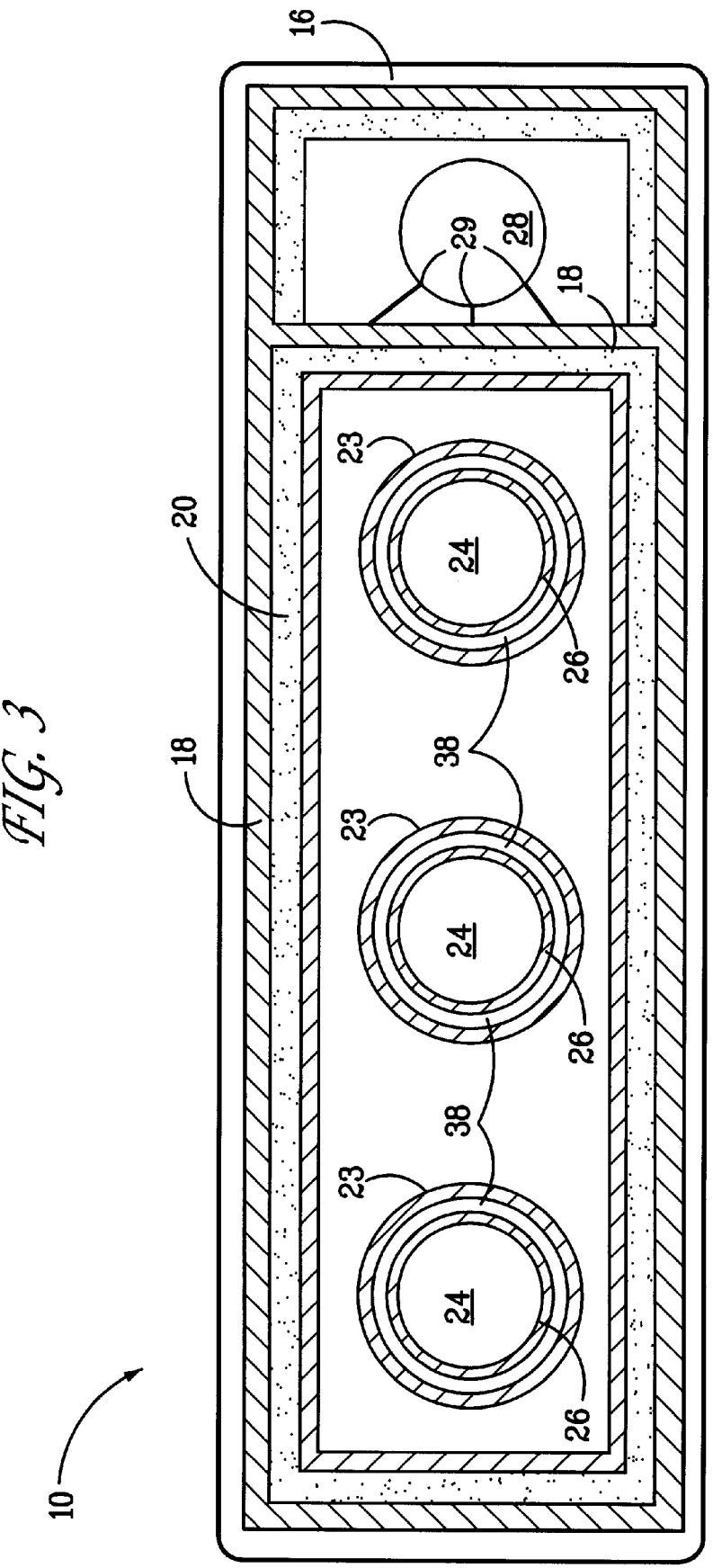
FIG. 3 is a view taken along line 3—3 of FIG. 1.
Figure 4:
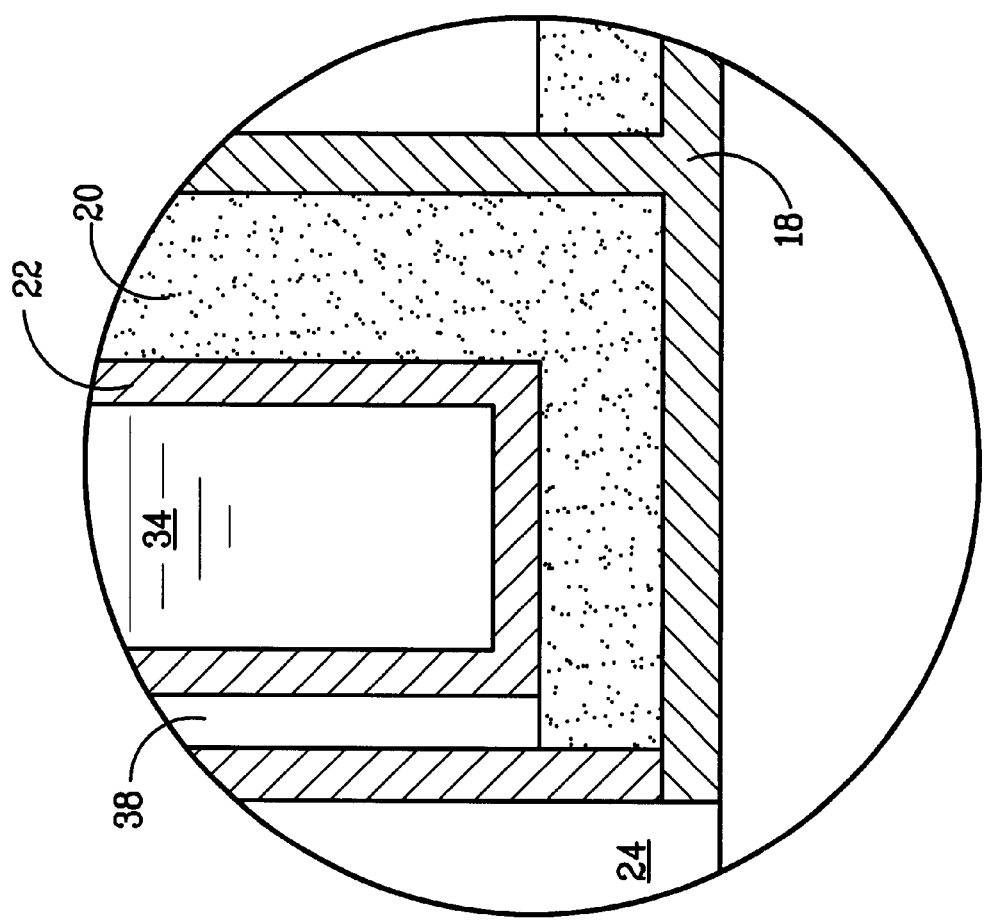
FIG. 4 is an enlarged view of the encircled area of FIG. 2.

As is best illustrated in FIGS. 2 and 3, passages 24 extend through the cryostat 10 and accommodate the limbs 36 through the tank 12. There are at least two such passages 24 extending through the cryostat 10. The three passages shown in FIGS. 2 and 3 illustrate the requirements for the case of a three phase transformer. The passages 24 are defined by openings in the lid 14 and bottom 15 and inner tubes 26 that are at ambient temperatures. As shown in FIGS. 2 and 3, tubes 26 are cylindrical, however, the tubes 26 can be any shape as long as they connect and extend between the openings in the lid 14 and bottom 15. Disposed around the inner tubes 26 are outer tubes 23, which are part of the inner liner 22. The space between the tubes 23 and 26 is filled with evacuated thermal insulation 38. Dissipation of core heat into the cryogenic coolant 34 is thus effectively prevented. Superconducting windings 30 are disposed around the tubes 23 so that they encompass core legs 36, whereby current is induced within the windings 30.

In one embodiment of the invention, the thermal insulation 38 around the core legs 36 is the same as the liner 20. In another embodiment of the invention, the evacuated thermal insulation 38 around the legs 36 is multi-layer insulation made from numerous aluminized polymer foils that reflect heat. This insulation is more compact which allows the windings 30 to be a smaller diameter.

Due to the non-gas permeability of metal, it is desired to use metallic material for the outer wall 18 of the cryostat 10. A problem with using a metallic material, however, is that stray magnetic flux from the core 32 will induce short circuit currents in the wall 18 along all electrical loops closing around the legs 36, which could destroy the transformer. For example, as shown in FIG. 6, the bottom surface 15 of the tank 12 forms closed paths 41 around the passages 24. The magnetic flux flowing through the limbs 36 will induce a stray current in these paths 41. As shown in FIG. 7, non-conducting strips 16 are inserted into slits between the passages 24 to electrically split the loops 41. As shown in FIG. 1, the strips 16 can also be placed in the tank 12 to interrupt closed loops in the side walls 18. Alternatively to using the strips 16, the bottom 15 of the tank 12 can be constructed from an electrically non-conducting material.

The design of the present invention allows for the cryostat 10 to be inexpensively manufactured. In particular, the metallic case acts as a mold that allows for the fabrication of the inner liner 22 directly in the metallic case, thereby eliminating the need for a separate molding process. First, the metallic case is formed by any traditional method, e.g., welding or boring a single piece of metallic material. A fiber glass bottom, having openings for the tubes 23, is then formed within the metallic case. The load bearing insulation layer 20 is next placed over the inner surfaces of the metallic tank, including the fiber glass bottom. For example, the load bearing insulation layer 20 comprises porous glass fiber boards that are placed onto the inner surfaces of the case. Next, resin tight polymer foils are laid over the layer 20 to prevent any of the fiber materials from the liner 22 from penetrating the layer 20. The liner 22 is then formed by laying balsa wood and dry glass fibers onto the foil covered fiber boards 20 followed by vacuum assisted resin infiltration.

It is contemplated that the metallic case can be formed with or without a metallic bottom section 15; in addition to the case having a removable lid 14. In an embodiment in which the case has a metallic bottom section 15, a plurality of openings and/or slits extend through the bottom section 15 and the removable lid 14. The inside of the bottom section 15 is lined with a fiber glass material which will become the vacuum tight composite covering the electrically insulating slits at the end of the manufacturing process.

In an embodiment in which the metallic case does not have a metallic bottom section, the bottom section 15 can be formed, with openings, from thick composite plates. Alternately, the bottom section 15 can be formed from a dry glass fiber layer or a glass fiber/balsa wood/glass fiber multi-layer that has been disposed onto a polymer foil, and then covered with a second polymer foil. The bottom section 15 can then be transformed into a composite using vacuum assisted resin infiltration.

After the bottom section 15 has been formed, either from a metal, glass fiber or a glass fiber/balsa wood multi-layer or other suitable material, a plurality of glass fiber boards, or boards made from compressed powder or microspheres, either plain or already evacuated and enclosed in a polymer foil or thin metal foil, are disposed onto the inside surfaces of the case. Next, resin tight polymer foils are placed over the glass fiber or powder or microsphere boards. An internal liner 22 is then formed by placing dry glass fiber along the internal surfaces of the case, and if desired, a dry glass fiber/balsa wood/dry glass fiber sandwich is formed in the bottom section 15. The dry internal liner 22 is then covered with polymer foils and transformed into a composite using vacuum assisted resin infiltration.

Furthermore, in accordance with the present invention, the passages 24 for the core limbs 36 can be manufactured separately from the composite tubes 23, 26, with suitable thermal insulation therebetween, and glued or otherwise attached into the openings in the bottom section 15 and removable lid 14 prepared from the process described above, or manufactured analogously as described above, around an inner composite tube 26.

Although the present invention has been described above with respect to particular preferred embodiments, it will be apparent to those skilled in the art that numerous modifications and variations can be made to these designs without departing from the spirit or essential attributes of the present invention. Accordingly, reference should be made to the appended claims, rather than to the foregoing specification, as indicating the scope of the invention. The descriptions provided are for illustrative purposes and are not intended to limit the invention.

What is claimed is:

1. A cryostat for a superconducting transformer, the transformer having a core with a plurality of limbs and a superconducting coil set disposed around each limb, each of the coil sets transforming current at a distinct phase, the cryostat comprising:

a non-gas permeable outer shell and an electrically non-conducting internal liner disposed within the outer shell, wherein the internal liner and the outer shell define a tank for containing a cryogenic coolant and for containing the coil sets, a plurality of electrical components, and a plurality of internal electrical connections of the transformer;

an insulation layer for substantially thermally isolating the internal liner from the outer shell, the insulation layer being disposed between the outer shell and the internal liner; and a first plurality of tubes extending through a first and a second end of the tank, each of the tubes having coil sets wound therearound, wherein the limbs of the core pass through the tubes so that the coil sets encompass the limbs.

2. The cryostat of claim 1, wherein the outer shell comprises a load bearing metallic frame.

3. The cryostat of claim 1, wherein the internal liner is constructed from a fiber composite material.

4. The cryostat of claim 3, wherein a metallic foil is formed integrally with the liner so as to reduce the gas permeation rate of the internal liner.

5. The cryostat of claim 3, wherein the internal liner includes flexible thermal expansion elements formed integrally therein.

6. The cryostat of claim 3, wherein the liner includes dielectric shielding formed integrally therewith.

7. The cryostat of claim 1, wherein the insulation layer is constructed from an electrically non-conducting and load bearing insulation material and wherein the insulation layer is in thermal contact with the internal liner.

8. The cryostat of claim 7, wherein the insulation layer is selected from a group consisting of glass fiber boards, powder, and microspheres.

9. The cryostat of claim 8, wherein vacuum pressure is maintained between the outer shell and the internal liner.

10. The cryostat of claim 1, wherein the outer casing includes electrical insulation strips for preventing the formation of eddy currents caused by stray magnetic flux from the core.

11. The cryostat of claim 1, further comprising a second plurality of tubes mounted inside the first plurality of tubes so as to define a space therebetween, wherein the limbs pass through the second tube.

12. The cryostat of claim 11, wherein thermal insulation is disposed within the space between the first plurality of tubes and the second plurality of tubes.

13. The cryostat of claim 12, wherein the thermal insulation disposed between the tubes comprises a evacuated glass fiber board, evacuated powder, or evacuated microspheres.

14. The cryostat of claim 12, wherein the thermal insulation disposed between the tubes comprises a multi-layer insulation constructed from aluminized polymer foils.

15. The cryostat of claim 1, further comprising a voltage regulation unit.

16. The cryostat of claim 15, wherein the voltage regulation unit is at least partially disposed in the cryogenic coolant.

17. The cryostat of claim 15, wherein the voltage regulation unit is substantially fully disposed in the cryogenic coolant.

18. The cryostat of claim 15, wherein the voltage regulation unit is a tap changer.

19. The cryostat of claim 18, wherein the tap changer is at least partially disposed in the cryogenic coolant.

20. The cryostat of claim 18, wherein the tap changer is substantially fully disposed in the cryogenic coolant.

21. A cryostat for a superconducting transformer, the transformer having a core with a plurality of limbs and a superconducting coil set disposed around each limb, each of the coil sets transforming current at a distinct phase, the cryostat comprising:

a tank into which a cryogenic coolant is placed, the tank comprising a metallic outer shell and an internal composite liner disposed within the outer shell;

a first and second plurality of passages, the first and second plurality of passages having a first plurality of non-conducting tubes extending therebetween around which are wound the coil sets and a second plurality of non-conducting tubes mounted within the first plurality of tubes and extending between the first and second plurality of passages, wherein the limbs of the core are placed through the second plurality of tubes so that the coils encompass the limbs; and a porous load bearing insulation layer disposed between the internal liner and the outer shell, the porous load bearing insulation layer being in thermal contact with the cryogenic coolant.

22. The cryostat of claim 21, further comprising a thermal insulation layer disposed between the first and second plurality of passages.

23. A method for manufacturing a cryostat for use with a superconducting transformer comprising:

forming a metallic case comprising a removable lid;

forming a bottom section on the metallic case;

forming a plurality of openings which extend through the bottom section and the removable lid of the metallic case;

placing a plurality of boards onto the inside surfaces of the case;

placing resin tight polymer foils over the boards; and forming an internal liner by laying dry glass fiber onto the inside surfaces of the case;

covering the internal liner with polymer foils; and transforming the liner into a composite.

24. The method according to claim 23, wherein the bottom section is metallic, and further comprising lining the inside of the bottom section of the metallic case with a fiber glass material prior to placing the plurality of boards onto the inside surfaces of the case, the plurality of boards being disposed over the fiber glass lined inside of the bottom section.

25. The method according to claim 23, wherein the bottom section comprises composite plates.

26. The method according to claim 23, wherein forming the bottom section comprises disposing one of a dry glass fiber layer and a glass fiber/balsa wood/glass fiber multilayer onto a polymer foil, and covering with a second polymer foil.

27. The method according to claim 26, further comprising transforming the bottom section into a composite using vacuum assisted resin infiltration.

28. The method according to claim 23, wherein placing the plurality of boards comprises placing glass fiber boards or boards comprising compressed powder or microspheres.

29. The method according to claim 28, wherein the boards are plain or evacuated and enclosed in a foil, the foil comprising a polymer or a metal.

30. The method according to claim 23, wherein forming the internal liner further comprises forming a dry glass fiber/balsa wood/dry glass fiber sandwich on the bottom section.

31. The method according to claim 23, wherein transforming the liner into a composite comprises using vacuum assisted resin infiltration.

32. The method according to claim 23, further comprising forming a first and second plurality of passages, the first and second plurality of passages having a first plurality of non-conducting composite tubes extending therebetween and a second plurality of non-conducting composite tubes mounted within the first plurality of tubes and extending between the first and second plurality of passages, the first and second plurality of tubes disposed into the openings in the bottom section and the removable lid, wherein the limbs of a core of the transformer are placed through the second plurality of tubes.

33. A method for manufacturing a cryostat for use with a superconducting transformer, the transformer having a core with a plurality of limbs and a superconducting coil set disposed around each limb, each of the coil sets transforming current at a distinct phase, the method comprising:

forming a tank into which a cryogenic coolant is placed, the tank comprising a metallic outer shell with a removable lid and a bottom section and an internal composite liner disposed within the outer shell;

forming a plurality of openings which extend through the bottom section and the removable lid of the metallic outer shell;

forming a first and second plurality of passages, the first and second plurality of passages having a first plurality of non-conducting composite tubes extending therebetween around which are wound the coil sets and a second plurality of non-conducting composite tubes mounted within the first plurality of tubes and extending between the first and second plurality of passages, the first and second plurality of tubes separated by thermal insulation and disposed into the openings in the bottom section and the removable lid, wherein the limbs of the core are placed through the second plurality of tubes so that the coils encompass the limbs; and disposing a porous load bearing insulation layer between the internal liner and the outer shell, the porous load bearing insulation layer being in thermal contact with the cryogenic coolant.

\* \* \* \* \*